(12) United States Patent
Jaganmohan et al.

(10) Patent No.: US 10,977,166 B1
(45) Date of Patent: Apr. 13, 2021

(54) SYSTEM FOR AUTOMATED ERROR ANALYSIS IN AN APPLICATION TESTING ENVIRONMENT USING ROBOTIC PROCESS AUTOMATION

(71) Applicant: Bank of America Corporation, Charlotte, NC (US)

(72) Inventors: Karthik Jaganmohan, Newark, DE (US); Jason Enger, Phoenix, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 16/601,809

(22) Filed: Oct. 15, 2019

(51) Int. Cl.
*G06F 9/44* (2018.01)
*G06F 11/36* (2006.01)
*G06K 9/62* (2006.01)
*G06N 5/02* (2006.01)
*G06N 5/04* (2006.01)

(52) U.S. Cl.
CPC ...... *G06F 11/3688* (2013.01); *G06F 11/3664* (2013.01); *G06K 9/6267* (2013.01); *G06N 5/02* (2013.01); *G06N 5/04* (2013.01)

(58) Field of Classification Search
CPC ............. G06F 11/3664; G06F 11/3688; G06K 9/6267; G06N 5/02; G06N 5/04
USPC .................................................. 717/124–135
See application file for complete search history.

(56) References Cited

U.S. PATENT DOCUMENTS

| | | |
|---|---|---|
| 5,930,512 A | 7/1999 | Boden et al. |
| 6,026,388 A | 2/2000 | Liddy et al. |
| 6,028,601 A | 2/2000 | Machiraju et al. |
| 6,038,560 A | 3/2000 | Wical |
| 6,052,710 A | 4/2000 | Saliba |
| 6,061,057 A | 5/2000 | Knowlton |
| 6,070,149 A | 5/2000 | Tavor |
| 6,076,088 A | 6/2000 | Paik |
| 6,078,914 A | 6/2000 | Redfern |
| 7,222,265 B1 * | 5/2007 | Lesuer ................ G06F 11/3414 714/38.1 |
| 7,581,212 B2 * | 8/2009 | West .................... G06F 40/154 717/136 |
| 7,680,855 B2 | 3/2010 | Hyder et al. |
| 7,707,203 B2 | 4/2010 | Hyder et al. |
| 7,945,537 B2 | 5/2011 | Balasubramanian et al. |
| 8,341,600 B2 | 12/2012 | Sutherland et al. |
| 8,365,147 B2 * | 1/2013 | Grechanik .......... G06F 9/45512 717/124 |

(Continued)

OTHER PUBLICATIONS

Oracle, "Error Handling", 1996, in PL/SQL User's Guide and Reference, Oracle Corporation, 13 pages. (Year: 1996).*

(Continued)

*Primary Examiner* — Ted T. Vo

(74) *Attorney, Agent, or Firm* — Michael A. Springs; Moore & Van Allen PLLC; Anup Shrinivasan Iyer

(57) ABSTRACT

Systems, computer program products, and methods are described herein for automated error analysis in an application testing environment using robotic process automation. The present invention is configured to electronically receive one or more exceptions from one or more automated test scripts; determine one or more exception types associated with the one or more exceptions; and initiate an exception handling bot configured to handle the one or more exceptions based on at least the one or more exception types.

20 Claims, 3 Drawing Sheets

DETERMINE ONE OR MORE EXCEPTION HANDLING ROUTINES ASSOCIATED WITH THE ONE OR MORE EXCEPTION TYPES FROM A KNOWLEDGE MANAGEMENT DATABASE
302

RETRIEVE, FROM THE KNOWLEDGE MANAGEMENT DATABASE, AT LEAST ONE OF THE ONE OR MORE EXCEPTION HANDLING ROUTINES
304

INITIATE, VIA THE EXCEPTION HANDLING BOT, AN EXECUTION THE AT LEAST ONE OF THE ONE OR MORE EXCEPTION HANDLING ROUTINES TO HANDLE THE ONE OR MORE EXCEPTIONS
306

(56) References Cited

U.S. PATENT DOCUMENTS

| | | | |
|---|---|---|---|
| 8,607,190 | B2 | 12/2013 | Coldicott et al. |
| 8,650,194 | B2 | 2/2014 | Hu |
| 8,930,301 | B2 | 1/2015 | Traupman et al. |
| 9,262,126 | B2 | 2/2016 | Ghaisas |
| 9,547,837 | B2 | 1/2017 | Hohmann et al. |
| 9,817,967 | B1* | 11/2017 | Shukla .................. B25J 9/1674 |
| 10,710,239 | B2* | 7/2020 | Safary .................... G06N 20/00 |
| 2006/0212466 | A1 | 9/2006 | Hyder et al. |
| 2012/0084112 | A1 | 4/2012 | Bagchi |
| 2018/0054523 | A1 | 2/2018 | Zhang et al. |
| 2019/0018692 | A1 | 1/2019 | Indyk et al. |
| 2019/0155225 | A1* | 5/2019 | Kothandaraman .... G06N 20/00 |

OTHER PUBLICATIONS

Sinha et al., "Analysis and Testing of Programs with Exception Handling Constructs", 2000, IEEE, pp. 849-871 (Year: 2000).*

Chacon-Montero et al., "Towards a Method for Automated Testing in Robotic Process Automation Projects", 2019, IEEE/ACM 14th International Workshop on Automation of Software Test, pp. 42-47 (Year: 2019).*

\* cited by examiner

SYSTEM FOR AUTOMATED ERROR ANALYSIS IN AN APPLICATION TESTING ENVIRONMENT USING ROBOTIC PROCESS AUTOMATION

FIELD OF THE INVENTION

The present invention embraces a system, a method and a product in the context of robotic process automation (RPA).

BACKGROUND

Entities are beginning to integrate robotic process automation (RPA) together with cognitive technologies such as speech recognition, natural language processing, and machine learning to automate perpetual and judgement-based tasks. This integration of cognitive technologies and RPA is extending automation to new areas and can help companies become more efficient and agile as they move down the path of becoming fully digital.

End-to-end application testing is used to test whether the flow of an application from start to finish is behaving as expected. This includes executing test automation scripts to validate the end-to-end application flows. However, application environment issues and data integrity issues may cause the test automation scripts to fail, requiring increased human intervention.

There is a need for a system for automated error analysis in an application testing environment using robotic process automation.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automated error analysis in an application testing environment using robotic process automation is presented. The system comprising: at least one non-transitory storage device; and at least one processing device coupled to the at least one non-transitory storage device, wherein the at least one processing device is configured to: electronically receive one or more exceptions from one or more automated test scripts; determine one or more exception types associated with the one or more exceptions; and initiate an exception handling bot configured to handle the one or more exceptions based on at least the one or more exception types, wherein handling further comprises: determining one or more exception handling routines associated with the one or more exception types from a knowledge management database; retrieving, from the knowledge management database, at least one of the one or more exception handling routines; and initiating an execution of the at least one of the one or more exception handling routines to handle the one or more exceptions.

In some embodiments, the at least one processing device is further configured to: generate an ad-hoc exception handling routine based on at least the one or more exception types.

In some embodiments, generating the ad-hoc exception handling routine further comprises: determine a pre-configured subroutine structure associated with the one or more exception types; receive information associated with the one or more exceptions, wherein the information associated with the one or more exceptions comprises one or more automated test script subroutines that have failed due to one or more application environment issues; receive information associated with the one or more automated test scripts, wherein the information associated with the one or more automated test scripts further comprises information associated with one or more application components being tested by the one or more automated test scripts; generate the ad-hoc exception handling routine based on at least the pre-configured subroutine structure, the information associated with the one or more exceptions, and the information associated with the one or more automated test scripts; and transmit control signals configured to cause the exception handling bot to execute the ad-hoc exception handling routine to handle the one or more exceptions.

In some embodiments, the at least one processing device is further configured to: update the knowledge management database with the one or more exceptions received from the one or more automated test scripts based on at least the one or more exception types.

In some embodiments, the knowledge management database comprises one or more exception handling routines associated with each of the one or more exception types.

In some embodiments, the at least one processing device is further configured to: determine whether the one or more exceptions have been resolved based on at least executing, using the exception handling bot, the at least one of the one or more exception handling routines to handle the exception; and re-execute the one or more automated test scripts based on at least determining that the one or more exceptions have been resolved.

In some embodiments, the at least one processing device is further configured to: implement one or more machine learning algorithms on one or more training examples, wherein the one or more training examples comprises one or more inputs and a supervisory signal, wherein the one or more inputs comprises at least one or more historical exceptions, wherein the supervisory signal comprises the one or more exception types; generate an inferred function based on at least implementing the one or more machine learning algorithms on the one or more training examples to classify one or more new observations, wherein the one or more new observations comprises the one or more exceptions.

In some embodiments, the at least one processing device is further configured to electronically receive the one or more exceptions; classify, using the inferred function, the one or more exceptions into at least one of the one or more exception types; and determine at least one of the one or more exception handling routines based on at least classifying the one or more exceptions into at least one of the one or more exception types.

In some embodiments, the at least one processing device is further configured to: determine that at least one of the one or more exceptions were not classified into at least one of the one or more exception types; transmit a control signal configured to initiate a user interface for display on a user device, wherein the user interface comprises information associated with the at least one of the one or more exceptions that were not classified into at least one of the one or more exception types; receive, via the user interface, a user input comprising one or more actions to resolve the at least one of the one or more exceptions; determine that the one or more actions resolves the at least one of the one or more exceptions; and re-execute the one or more automated test scripts based on at least determining that the at least one of the one or more exceptions have been resolved.

In another aspect, a computer implemented method for automated error analysis in an application testing environment using robotic process automation is presented. The method comprising: electronically receiving one or more exceptions from one or more automated test scripts; determining one or more exception types associated with the one or more exception; and initiating an exception handling bot configured to handle the one or more exceptions based on at least the one or more exception types, wherein handling further comprises: determining one or more exception handling routines associated with the one or more exception types from a knowledge management database; retrieving, from the knowledge management database, at least one of the one or more exception handling routines; and initiating an execution of the at least one of the one or more exception handling routines to handle the one or more exceptions.

In yet another aspect, a computer program product for automated error analysis in an application testing environment using robotic process automation is presented. The computer program product comprising a non-transitory computer-readable medium comprising code causing a first apparatus to: electronically receive one or more exceptions from one or more automated test scripts; determine one or more exception types associated with the one or more exceptions; initiate an exception handling bot configured to handle the one or more exceptions based on at least the one or more exception types, wherein handling further comprises: determining one or more exception handling routines associated with the one or more exception types from a knowledge management database; retrieving, from the knowledge management database, at least one of the one or more exception handling routines; and initiating an execution of the at least one of the one or more exception handling routines to handle the one or more exceptions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
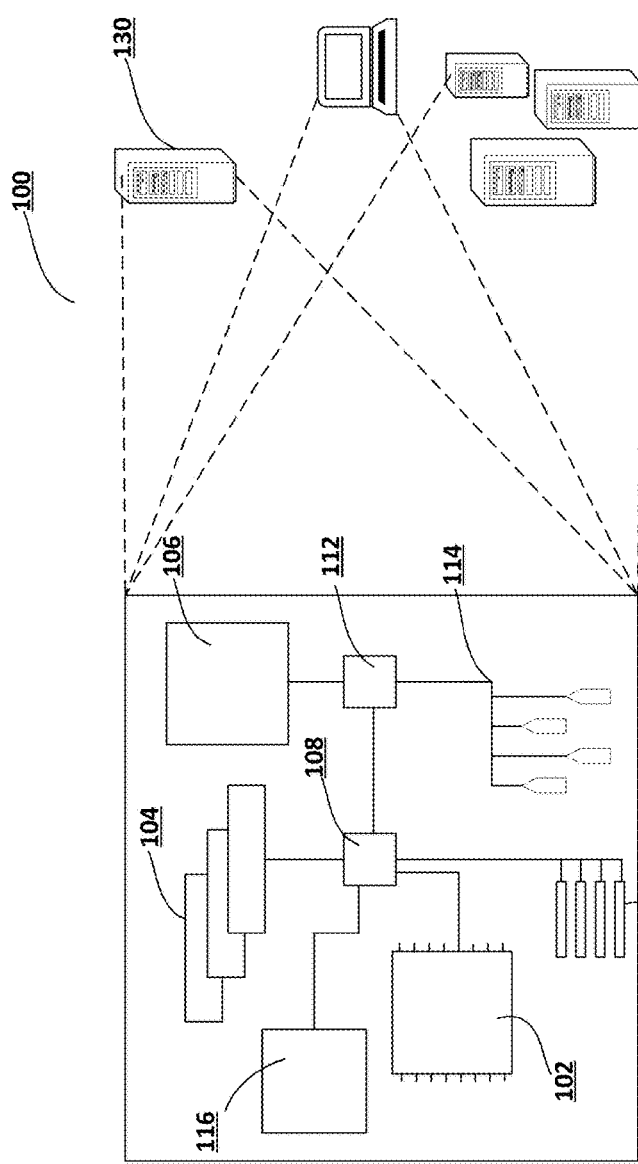
Figure 1:
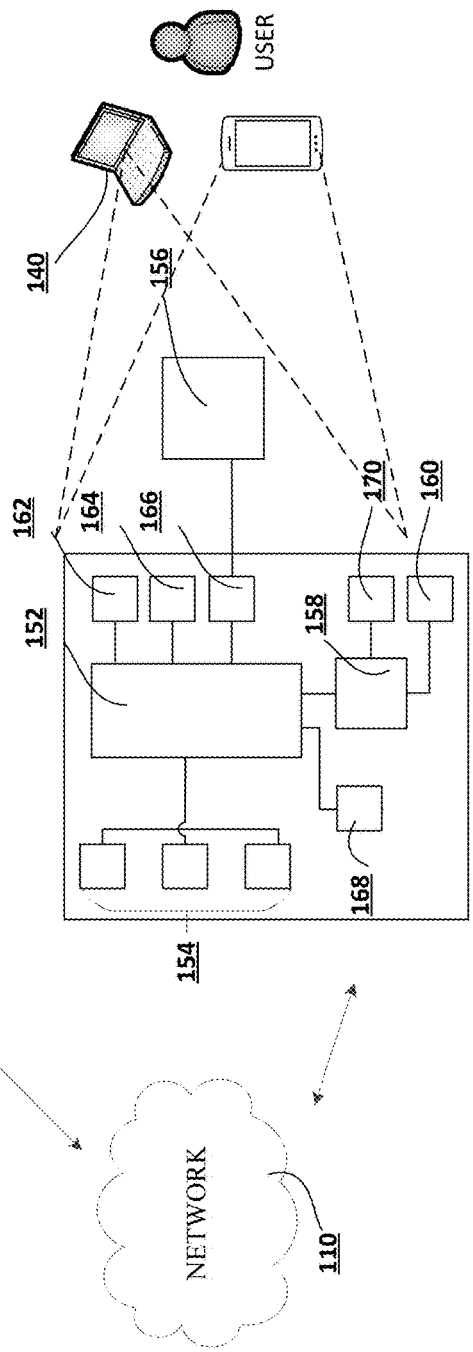
Figure 2:
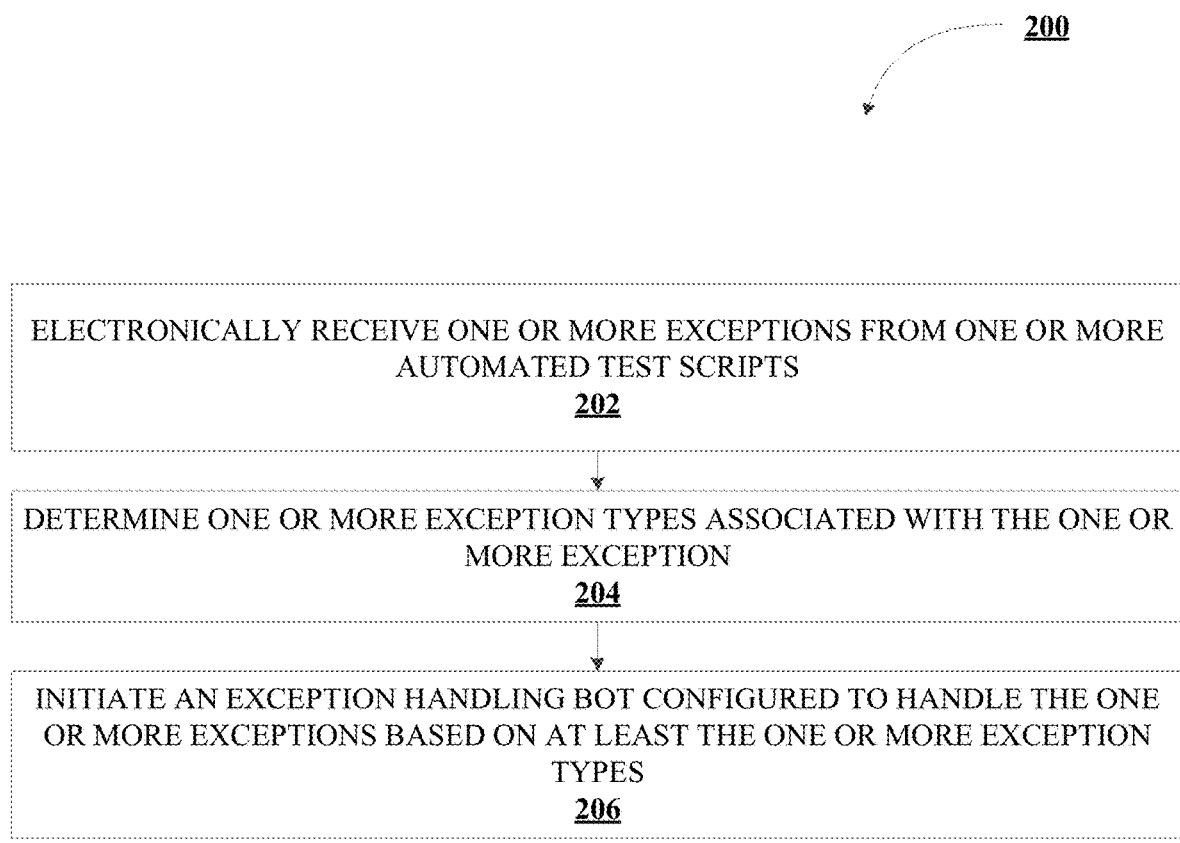
Figure 3:
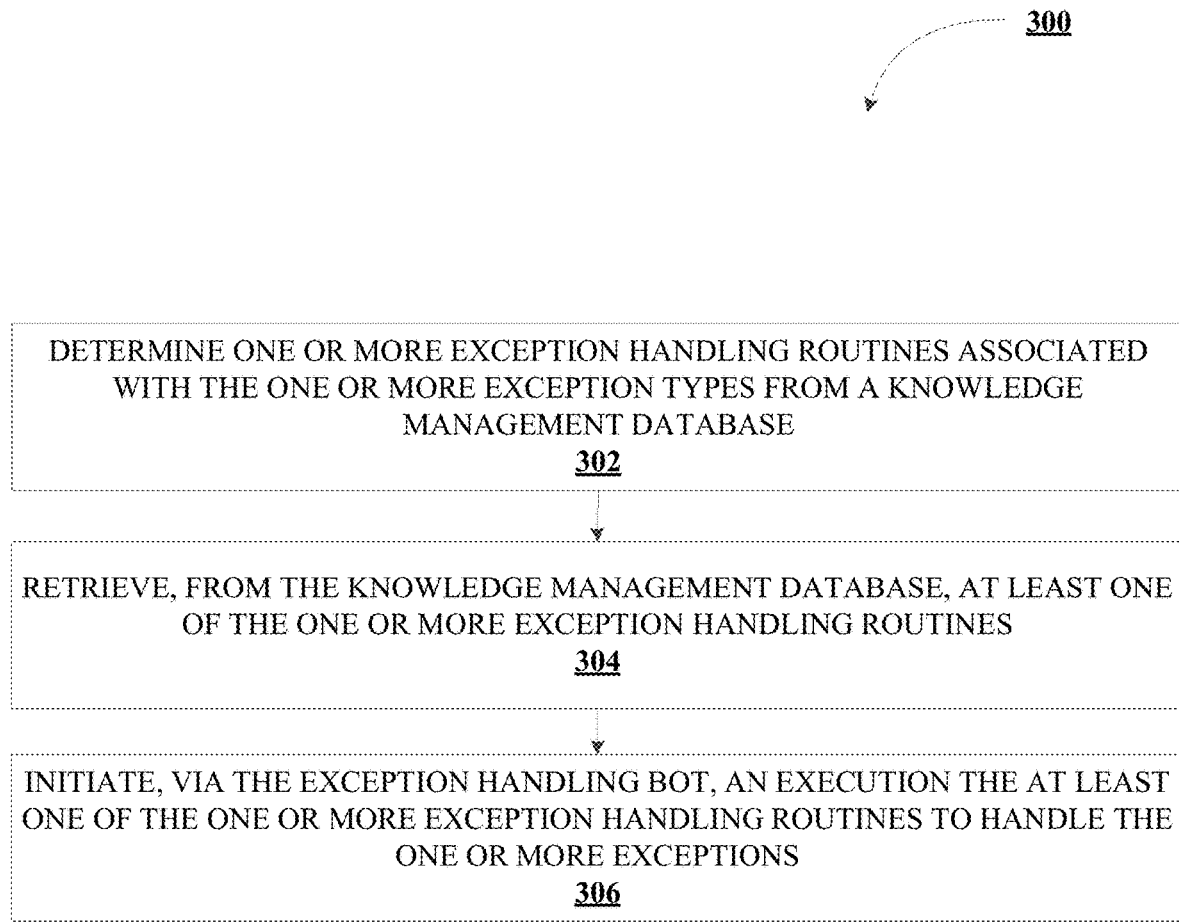

Having thus described embodiments of the invention in general terms, reference will now be made the accompanying drawings, wherein:

FIG. 1 illustrates technical components of a system for automated error analysis in an application testing environment using robotic process automation, in accordance with an embodiment of the invention;

FIG. 2 illustrates a process flow for automated error analysis in an application testing environment using robotic process automation, in accordance to an embodiment of the invention; and FIG. 3 illustrates a process flow for executing exception handling routines using an exception handling bot, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a tester, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment for automated error analysis in an application testing environment using robotic process automation 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

End-to-end testing is a technique used to test whether the flow of an application right from start to finish is behaving as expected. The purpose of performing end-to-end testing is to identify system dependencies and to ensure that the data integrity is maintained between various system components and systems. The entire application is tested for critical functionalities such as communicating with the other systems, interfaces, database, network, and other applications. This includes executing test automation scripts to validate the end-to-end application flows. The primary advantage of automated testing is the ability to repeatedly and consistently test application functions. However, executing test automation scripts requires a stable application testing environment with consistent and accurate test data at all times. Issues with the application testing environment and unreliable test data may cause the test automation scripts to fail, requiring increased user intervention to be resolved.

The present invention provides the functional benefit of using robotic process automation (RPA) to develop a solution that analyzes test results of an execute automation script for failures. In Robotic Process Automation (RPA), a computer system or robot may mimic the actions of a human being in order to perform a computer-based task. In other words, RPA can be used to interact with application software (or application, for short) through its user interface, as a human being would do. Therefore, it is not necessary to integrate RPA with the existing applications at a programming level, thereby eliminating the difficulties inherent to integration, namely bringing together diverse components. In this way, RPA can be used to automate the execution of repetitive and manually intensive activities. RPA's potential benefits are manifold. They can include reducing costs, lowering man-hours on recurring actions, lowering error rates, improving service, reducing turnaround time, increasing the scalability of operations, and improving compliance. Implementing RPA typically includes using a configurable software set up referred to as "bots" to perform the assigned tasks to automate the business process. These bots cross verify the test results against the defined application checkpoints and possible error scenarios. In response, the bots may be configured to initiate the recovery process to re-execute the test scripts automatically based on the error scenarios defined in the bot knowledge management database.

FIG. 2 illustrates a process flow for automated error analysis in an application testing environment using robotic process automation 200, in accordance to an embodiment of the invention. As shown in block 202, the process flow includes electronically receiving one or more exceptions from one or more automated test scripts.

An application test environment is a platform that is specifically built for implementing and executing the test cases on a software product. The environment for testing is typically created by integrating the required hardware and software with proper configuration and necessary settings. The test environment is configured to simulate a production environment or a real environment that enables the users to influence their testing activities with the conditions and factors of the real environment, as to evaluate the working of the software product in the real world. In this regard, the users implement automated test scripts to test whether the flow of an application right from start to finish is behaving as expected. In doing so, users may determine whether the various functions of the application are functioning as expected, identify application dependencies, and ensure that data integrity is maintained between the various functions, components, and systems. However, automated test scripts tend to fail due to issues in the test environment.

An effective application testing procedure not only requires a stable application testing environment, but also accurate and reliable test data. In some embodiments, test data may be created specifically for testing the various functions of the application by mimicking the production environment data. In this regard, the test data may be produced in a focused or systematic way (as is typically the case in domain testing), or by using other, less-focused approaches (as is typically the case in high-volume randomized automated tests). Test data may be produced by the tester, or by a program or function that aids the tester. Test data may be recorded for re-use or used once and then forgotten. In some other embodiments, a de-sensitized subset of production environment data may be used as test data in the application testing environment. Typically, the test data is stored in multiple test databases and are capable of being accessed by the automated test scripts. These test scripts are configured to retrieve the test data from one or more test databases during the testing process via one or more data interaction channels. Thus, issues with test data integrity may not only cause the automated test scripts to fail but may also result in unreliable application test results.

When automated test scripts fail, it results in the occurrence, during computation, of exceptions—anomalous or exceptional conditions during testing. An exception typically occurs when an unexpected event happens that requires special processing. When an exception occurs, the system may be configured to receive the one or more exceptions from the one or more automated test scripts.

Next, as shown in block 204, the process flow includes determining one or more exception types associated with the one or more exceptions. In some embodiments, each exception may be associated with an exception type. In one aspect, one or more exception types may include, but is not limited to, predefined exceptions, non-predefined exceptions, built-in exceptions, checked exceptions, unchecked exceptions, user-defined exceptions, and/or the like. Each exception type may be associated with a specific exception handling routine to resolve the exception.

Next, as shown in block 206, the process flow includes initiating an exception handling bot configured to handle the one or more exceptions based on at least the one or more exception types. Typically, the exception handling routines are executed by users manually for each exception received from an automated test script, which involves time and resources that could be best allocated to other issues. Most of these exception handling routines are repeated actions executed by the user when attempting to resolve each exception. The present invention provides the functional benefit of implementing configurable software components named "bots" to perform repetitive tasks that can be assigned and controlled by the user. In doing so, the present invention can reduce operating costs and error rates during the application testing process. When initiated, each exception handling bot may be configured to interact with the automated test scripts, and in some cases, the underlying application being tested to handle the one or more exceptions.

In some embodiments, the exception handling bot may be configured to be executed on the one or more exceptions via one or more components of the system 130 described herein. In some other embodiments, the exception handling bot may be configured to be executed on the one or more exceptions via a number of other computing devices operatively connected to the system 130 and/or the user input system 140.

FIG. 3 illustrates a process flow for executing exception handling routines using an exception handling bot 300, in accordance with an embodiment of the invention. As shown in block 302, the process flow includes determining one or more exception handling routines associated with the one or more exception types from a knowledge management database. In some embodiments, the knowledge management database includes one or more exception handling routines associated with each of the one or more exception types. In one aspect, each of these exception handling routines were previously implemented manually by the user to resolve one or more historical exceptions associated with one or more exception types. By storing the historical exceptions, exception types, and the exception handling routines implemented to resolve the historical exceptions, the knowledge management database may be populated to enable exception handling bots to access exception handling routines based on the exception type to resolve the exceptions.

In some embodiments, the system may be configured to generate an ad-hoc exception handling routine based on at least the one or more exception types. In this regard, the system may be configured to determine a pre-configured subroutine structure associated with the one or more exception types. The system may then be configured to receive information associated with the one or more exceptions. In one aspect, the information associated with the one or more exceptions includes one or more automated test script subroutines that have failed due to one or more application environment issues. In addition, the system may be configured to receive information associated with the one or more automated test scripts. In one aspect, the information associated with the one or more automated test scripts includes information associated with one or more application components being tested by the one or more automated test scripts. In response, the system may be configured to generate the ad-hoc exception handling routine based on at least the pre-configured subroutine structure, the information associated with the one or more exceptions, and the information associated with the one or more automated test scripts. Once generated, the system may be configured to transmit control signals configured to cause the exception handling bot to execute the ad-hoc exception handling routine to handle the one or more exceptions.

Next, as shown in block 304, the process flow includes retrieving, from the knowledge management database, at least one of the one or more exception handling routines. In some embodiments, the exception handling bots may be configured to query the knowledge management database to retrieve one or more exception handling routines based on the received exceptions. In this regard, the exception handling bot may be configured to establish a communication link with the knowledge management database and create a data channel between the knowledge management database and the exception handling bot.

Next, as shown in block 306, the process flow includes initiating an execution of the at least one of the one or more exception handling routines to handle the one or more exceptions. In some embodiments, the system may be configured to determine whether the one or more exceptions have been resolved based on at least executing, using the exception handling bot, the at least one of the one or more exception handling routines to handle the exception. In some embodiments, the one or more exception handling routines may include procuring and reconditioning the test data. In this regard, the exception handling bot may be configured to determine one or more test databases associated with the test data causing the one or more exceptions. In response, the exception handling bot may be configured to establish an ad-hoc communication link with the one or more test databases and retrieving the test data. In response to retrieving the test data, the exception handling bot may be configured to condition the test data. In one aspect, the exception handling bot may be configured to employ data management and optimization techniques specific to the automated test script, which may result in intelligent routing, optimization, and protection of data for storage or data movement in the application testing environment. In addition to data conditioning, the exception handling bot may be configured to employ data cleaning techniques to search for and correct records that are inaccurate or corrupt within the one or more test databases. In one aspect, cleaning the test data comprises determining parts of the test data that are deemed to be irrelevant, incorrect, or incomplete, and then deleting, replacing, or modifying them. In this regard, the exception handling bot may be configured to implement data standardization techniques which uses standard code to ensure all test data matches and data enhancement—which adds more data to an entry by appending related information.

In response, the system may be configured to re-execute the one or more automated test scripts based on at least determining that the one or more exceptions have been resolved. In some embodiments, prior to re-executing the automated test scripts, the system may be configured to determine whether the test data resulting from the data conditioning and data cleaning process meets the criteria for quality specific to the automated test script including being valid according to its particular category, complete, accurate, uniform, and consistent. In this regard, the system may be configured to implement quality screen based diagnostic filters capable of processing the test data.

In some embodiments, the advanced technology platform of the system may be configured to employ a robust ensemble of machine learning algorithms/models and related systems. Using these finely tuned and perpetually evolving and tunable machine learning algorithms/models, the system may be capable of predicting an exception handling routine with high accuracy and, in some embodiments, in real-time (e.g., as the exceptions occur or shortly thereafter)

The machine learning algorithms/models function to identify or classify features of the collected historical exceptions into exception types. Accordingly, the machine learning algorithms/models may be implemented by a plurality of computing servers (e.g., a combination of web servers and private servers) that implement one or more ensembles of machine learning algorithms/models. The ensemble of machine learning models may include hundreds and/or thousands of machine learning models that work together to classify features of the historical exceptions and namely, to classify or detect features that may indicate its likelihood of association with an exception type. The machine learning algorithms/models may additionally utilize the information from the historical exceptions, exception types, and various other data sources (e.g., outputs of system 130, system 130 derived knowledge data, external entity-maintained data, etc.) to continuously improve or accurately tune weightings associated with features of the one or more of the machine learning algorithms/models defining the ensembles.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

In some embodiments, executing the machine learning algorithms/models may include training the machine learning algorithm/model using the historical exceptions stored in the knowledge management database as inputs. For purposes of the invention, the phrase "historical exceptions" are exceptions received during a predetermined time in the past. Each exception received and processed, when moved to be stored in the knowledge management database is since referred to as a historical exception. In a supervised machine learning framework, historical exceptions previously classified into the various exception types are used as desired outputs to produce an inferred function which can then be used to classify new observations. In an unsupervised machine learning framework, the machine learning algorithms/models aim to find previously unknown patterns in the data without pre-existing labels. This method of identifying such patterns is also known as self-organization and allows modeling probability densities of given inputs. Once trained, the machine learning algorithms/models are now capable of classifying new observations. For purposes of the invention, new observations include any exception received from the execution of automated test scripts. In a supervised learning framework, the machine learning algorithm/model maps each new exception received to an exception type based on the inferred function generated by training the historical exceptions. In an unsupervised learning framework, the machine learning algorithm/model generates the inferred function based on identifying commonalities in the historical exceptions and classifies each new exception into an exception type based on the presence or absence of such commonalities in any new exception received.

In response to classifying the exceptions into one or more exception type, the system may be configured to determine one or more exception handling routines to resolve the exceptions, as described above.

In some embodiments, the system may be configured to determine that at least one of the one or more exceptions were not classified into at least one of the one or more exception types. In response, the system may be configured to transmit a control signal configured to initiate a user interface for display on a user device, wherein the user interface includes information associated with the at least one of the one or more exceptions that were not classified into at least one of the one or more exception types. In response, the system may be configured to receive, via the user interface, the user input comprising one or more actions to resolve the at least one of the one or more exceptions.

In response to receiving the user input, the system may be configured to determine that the one or more actions resolves the at least one of the one or more exceptions. In response to determining that the one or more actions resolves the at least one of the one or more exceptions, the system may be configured to re-execute the one or more automated test scripts.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automated error analysis in an application testing environment using robotic process automation, the system comprising:
   at least one non-transitory storage device; and
   at least one processing device coupled to the at least one non-transitory storage device, wherein the at least one processing device is configured to:
   electronically receive one or more exceptions from one or more automated test scripts;
   determine one or more exception types associated with the one or more exceptions; and
   initiate an exception handling bot configured to handle the one or more exceptions based on at least the one or more exception types, wherein handling further comprises:
      determining one or more exception handling routines associated with the one or more exception types from a knowledge management database;
      retrieving, from the knowledge management database, at least one of the one or more exception handling routines; and
      initiating an execution of the at least one of the one or more exception handling routines to handle the one or more exceptions.

2. The system of claim 1, wherein the at least one processing device is further configured to:
   generate an ad-hoc exception handling routine based on at least the one or more exception types.

3. The system of claim 2, wherein the at least one processing device is further configured to:
   determine a pre-configured subroutine structure associated with the one or more exception types;
   receive information associated with the one or more exceptions, wherein the information associated with the one or more exceptions comprises one or more automated test script subroutines that have failed due to one or more application environment issues;
   receive information associated with the one or more automated test scripts, wherein the information associated with the one or more automated test scripts further comprises information associated with one or more application components being tested by the one or more automated test scripts;
   generate the ad-hoc exception handling routine based on at least the pre-configured subroutine structure, the information associated with the one or more exceptions, and the information associated with the one or more automated test scripts; and
   transmit control signals configured to cause the exception handling bot to execute the ad-hoc exception handling routine to handle the one or more exceptions.

4. The system of claim 1, wherein the at least one processing device is further configured to:
   update the knowledge management database with the one or more exceptions received from the one or more automated test scripts based on at least the one or more exception types.

5. The system of claim 1, wherein the knowledge management database comprises one or more exception handling routines associated with each of the one or more exception types.

6. The system of claim 1, wherein the at least one processing device is further configured to:
   determine whether the one or more exceptions have been resolved based on at least executing, using the exception handling bot, the at least one of the one or more exception handling routines to handle the exception; and
   re-execute the one or more automated test scripts based on at least determining that the one or more exceptions have been resolved.

7. The system of claim 1, wherein the at least one processing device is further configured to:
   implement one or more machine learning algorithms on one or more training examples, wherein the one or more training examples comprises one or more inputs and a supervisory signal, wherein the one or more inputs comprises at least one or more historical exceptions, wherein the supervisory signal comprises the one or more exception types; and generate an inferred function based on at least implementing the one or more machine learning algorithms on the one or more training examples to classify one or more new observations, wherein the one or more new observations comprises the one or more exceptions.

8. The system of claim 7, wherein the at least one processing device is further configured to:

electronically receive the one or more exceptions;

classify, using the inferred function, the one or more exceptions into at least one of the one or more exception types; and determine at least one of the one or more exception handling routines based on at least classifying the one or more exceptions into at least one of the one or more exception types.

9. The system of claim 7, wherein the at least one processing device is further configured to:

determine that at least one of the one or more exceptions were not classified into at least one of the one or more exception types;

transmit a control signal configured to initiate a user interface for display on a user device, wherein the user interface comprises information associated with the at least one of the one or more exceptions that were not classified into at least one of the one or more exception types;

receive, via the user interface, a user input comprising one or more actions to resolve the at least one of the one or more exceptions;

determine that the one or more actions resolves the at least one of the one or more exceptions; and re-execute the one or more automated test scripts based on at least determining that the at least one of the one or more exceptions have been resolved.

10. A computer implemented method for automated error analysis in an application testing environment using robotic process automation, the method comprising:

electronically receiving one or more exceptions from one or more automated test scripts;

determining one or more exception types associated with the one or more exception; and initiating an exception handling bot configured to handle the one or more exceptions based on at least the one or more exception types, wherein handling further comprises:

determining one or more exception handling routines associated with the one or more exception types from a knowledge management database;

retrieving, from the knowledge management database, at least one of the one or more exception handling routines; and initiating an execution of the at least one of the one or more exception handling routines to handle the one or more exceptions.

11. The method of claim 10, wherein the method further comprises generating, using the exception handling bot, an ad-hoc exception handling routine based on at least the one or more exception types.

12. The method of claim 11, wherein generating the ad-hoc exception handling routine further comprises:

determining a pre-configured subroutine structure associated with the one or more exception types;

receiving information associated with the one or more exceptions, wherein the information associated with the one or more exceptions comprises one or more automated test script subroutines that have failed due to one or more application environment issues;

receiving information associated with the one or more automated test scripts, wherein the information associated with the one or more automated test scripts further comprises information associated with one or more application components being tested by the one or more automated test scripts;

generating the ad-hoc exception handling routine based on at least the pre-configured subroutine structure, the information associated with the one or more exceptions, and the information associated with the one or more automated test scripts; and transmitting control signals configured to cause the exception handling bot to execute the ad-hoc exception handling routine to handle the one or more exceptions.

13. The method of claim 10, wherein the method further comprises updating the knowledge management database with the one or more exceptions received from the one or more automated test scripts based on at least the one or more exception types.

14. The method of claim 10, wherein the method further comprises:

determining whether the one or more exceptions have been resolved based on at least executing, using the exception handling bot, the at least one of the one or more exception handling routines to handle the exception; and re-executing the one or more automated test scripts based on at least determining that the one or more exceptions have been resolved.

15. The method of claim 10, wherein the method further comprises:

implementing one or more machine learning algorithms on one or more training examples, wherein the one or more training examples comprises one or more inputs and a supervisory signal, wherein the one or more inputs comprises at least one or more historical exceptions, wherein the supervisory signal comprises the one or more exception types; and generating an inferred function based on at least implementing the one or more machine learning algorithms on the one or more training examples to classify one or more new observations, wherein the one or more new observations comprises the one or more exceptions.

16. The method of claim 15, wherein the method further comprises:

electronically receiving the one or more exceptions;

classifying, using the inferred function, the one or more exceptions into at least one of the one or more exception types; and determining at least one of the one or more exception handling routines based on at least classifying the one or more exceptions into at least one of the one or more exception types.

17. The method of claim 15, wherein the method further comprises:

determining that at least one of the one or more exceptions were not classified into at least one of the one or more exception types; and transmitting a control signal configured to initiate a user interface for display on a user device, wherein the user interface comprises information associated with the at least one of the one or more exceptions that were not classified into at least one of the one or more exception types; and receiving, via the user interface, a user input comprising one or more actions to resolve the at least one of the one or more exceptions;

determining that the one or more actions resolves the at least one of the one or more exceptions; and re-executing the one or more automated test scripts based on at least determining that the at least one of the one or more exceptions have been resolved.

18. A computer program product for automated error analysis in an application testing environment using robotic process automation, the computer program product comprising a non-transitory computer-readable medium comprising code causing a first apparatus to:

electronically receive one or more exceptions from one or more automated test scripts;
 determine one or more exception types associated with the one or more exceptions;
 initiate an exception handling bot configured to handle the one or more exceptions based on at least the one or more exception types, wherein handling further comprises:
  determining one or more exception handling routines associated with the one or more exception types from a knowledge management database;
  retrieving, from the knowledge management database, at least one of the one or more exception handling routines; and
  initiating an execution of the at least one of the one or more exception handling routines to handle the one or more exceptions.

19. The computer program product of claim 18, wherein the first apparatus is further configured to generate an ad-hoc exception handling routine based on at least the one or more exception types.

20. The computer program product of claim 19, wherein generating the ad-hoc exception handling routine further comprises:

determine a pre-configured subroutine structure associated with the one or more exception types;
 receive information associated with the one or more exceptions, wherein the information associated with the one or more exceptions comprises one or more automated test script subroutines that have failed due to one or more application environment issues;
 receive information associated with the one or more automated test scripts, wherein the information associated with the one or more automated test scripts further comprises information associated with one or more application components being tested by the one or more automated test scripts;
 generate the ad-hoc exception handling routine based on at least the pre-configured subroutine structure, the information associated with the one or more exceptions, and the information associated with the one or more automated test scripts; and
 transmit control signals configured to cause the exception handling bot to execute the ad-hoc exception handling routine to handle the one or more exceptions.

* * * * *